US010838544B1

(12) United States Patent
Montalvo-Ruiz et al.

(10) Patent No.: US 10,838,544 B1
(45) Date of Patent: Nov. 17, 2020

(54) DETERMINATION OF A USER ORIENTATION WITH RESPECT TO A TOUCHSCREEN DEVICE

(71) Applicant: Raytheon Company, Waltham, MA (US)

(72) Inventors: Eisen Montalvo-Ruiz, Tucson, AZ (US); Jon E. Peoble, Tucson, AZ (US); Jack Barrett, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/547,551

(22) Filed: Aug. 21, 2019

(51) Int. Cl.
*G06F 3/041* (2006.01)
*G06F 3/048* (2013.01)

(52) U.S. Cl.
CPC ............ *G06F 3/0416* (2013.01); *G06F 3/048* (2013.01); *G06F 2200/1614* (2013.01)

(58) Field of Classification Search
None
See application file for complete search history.

(56) References Cited

U.S. PATENT DOCUMENTS

| | | | |
|---|---|---|---|
| 2009/0193366 A1 | 7/2009 | Davidson | |
| 2010/0310136 A1 | 12/2010 | Tsuda | |
| 2012/0154313 A1* | 6/2012 | Au | G06F 3/04883 345/173 |
| 2013/0083074 A1* | 4/2013 | Nurmi | G06F 3/0488 345/650 |
| 2013/0113714 A1* | 5/2013 | Mao | G06F 3/0234 345/173 |
| 2013/0127733 A1* | 5/2013 | Krishnaswamy | G06F 3/04883 345/173 |
| 2013/0194173 A1* | 8/2013 | Zhu | G06F 3/011 345/156 |
| 2013/0201115 A1 | 8/2013 | Heubel | |
| 2013/0201155 A1 | 8/2013 | Wu et al. | |
| 2013/0207920 A1 | 8/2013 | McCann et al. | |

(Continued)

FOREIGN PATENT DOCUMENTS

| | | |
|---|---|---|
| EP | 1865404 A1 | 12/2007 |
| EP | 2191352 A1 | 6/2010 |

(Continued)

OTHER PUBLICATIONS

International Search Report for International Application No. PCT/US2020/038709 dated Sep. 8, 2020, 12 pages.

*Primary Examiner* — Frank S Chen

(57) ABSTRACT

A technology is described for orienting a user interface. An example of the technology can include receiving touchpoint data for a plurality of touchpoints detected by a touchscreen sensor. The touchpoint data can be analyzed to determine distances between each touchpoint to other touchpoints in the plurality of touchpoints, and the touchpoints can be ranked based on the distances between the touchpoints. A vector can be calculated for a top ranked touchpoint, where the vector can have a direction that extends from a center point of a circle fitted to the touchpoints to the top ranked touchpoint. An orientation of a user with respect to the touchscreen can be determined based on the direction of the vector, and the user interface can be displayed on the touchscreen to correspond to the orientation of the user to the touchscreen.

21 Claims, 8 Drawing Sheets

(56) References Cited

U.S. PATENT DOCUMENTS

| | | | |
|---|---|---|---|
| 2013/0275907 A1* | 10/2013 | Lau | G06F 3/0488 |
| | | | 715/773 |
| 2014/0009403 A1 | 1/2014 | Tremblay et al. | |
| 2014/0152560 A1* | 6/2014 | Hussain | G06F 3/04886 |
| | | | 345/158 |
| 2014/0215413 A1* | 7/2014 | Calkins | G06F 3/04855 |
| | | | 715/863 |
| 2014/0313168 A1* | 10/2014 | Luo | G06F 3/04886 |
| | | | 345/175 |
| 2015/0084913 A1 | 3/2015 | Okano | |

FOREIGN PATENT DOCUMENTS

| | | |
|---|---|---|
| EP | 2503441 A1 | 9/2012 |
| EP | 2963530 A1 | 1/2016 |
| JP | 2013-105425 A | 5/2013 |
| KR | 2014-0033726 A | 3/2014 |

* cited by examiner

DETERMINATION OF A USER ORIENTATION WITH RESPECT TO A TOUCHSCREEN DEVICE

BACKGROUND

A touchscreen generally relates to an input device which can be layered on the top of an electronic visual display of an information processing system, such as a computer device. A user can provide input or control the information processing system through single or multi-touch gestures by touching the screen of the information processing system with one or more fingers or input stylus. A touchscreen may enable a user to interact directly with what is displayed on a screen, rather than using a mouse, touchpad, or other such devices. For example, a user can use touch gestures to "zoom in" to increase the size of what is being displayed on a screen, and "zoom out" to decrease the size of what is being displayed on the screen.

Touchscreens may be common in devices such as mobile devices, game consoles, personal computers, electronic voting machines, and point-of-sale (POS) systems. Touchscreens can play a prominent role in the design of digital appliances such as personal digital assistants (PDAs) and some e-readers. Touchscreens can also play an important role in educational settings such as classrooms or on college campuses, as well as in business and government settings. For example, a table computer that includes a large multi-touch touchscreen display can provide users with a way to collaborate around the touchscreen display.

Figure 1:
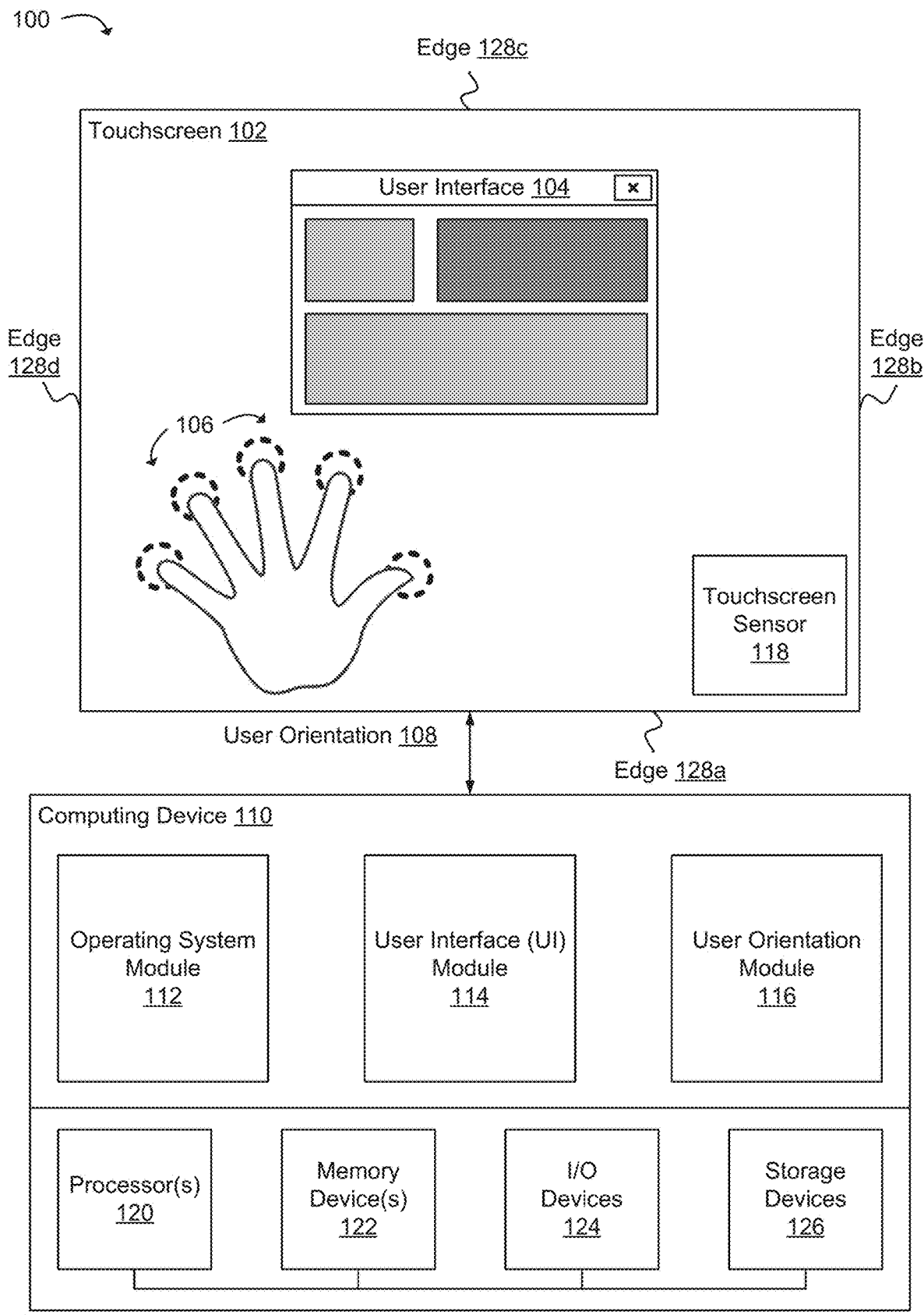
FIG. 1 is a block diagram illustrating an example system used to determine a user orientation and output a user interface to a touchscreen to correspond to the user orientation.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for determining an orientation of a user with respect to a touchscreen and displaying a user interface to correspond to the orientation of the user. In one example, the technology can be used to determine an orientation of a user around a touchscreen device in a supine configuration based in part on touchpoints detected by the touchscreen device and present graphical elements on the touchscreen device in the orientation that the user is facing. For example, a touchscreen device in a supine configuration can have multiple edges to which a user may be facing. The technology can be used to determine which edge of the touchscreen device a user is facing and display a user interface on the touchscreen device in an orientation that faces the user. For example, a user interface can be oriented to correspond to a user's sense of top-down two dimensional space.

In one example of the technology, touchpoint data representing locations of a plurality of touchpoints on a surface of a touchscreen can be analyzed to determine distances between the touchpoints. The distances between the touchpoints can be used to determine which of the touchpoints correspond to digits of a particular hand. The touchpoints that correspond to digits of the hand can be grouped together and the touchpoints can be classified as individual digits of the hand (e.g., classified as index, middle, ring, pinky, and/or thumb digits). In one example, scores can be calculated for the touchpoints based on the distance between the touchpoints, and the scores can be used to assign a digit classification (e.g., index, middle, ring, pinky, or thumb) to a touchpoint, as described in more detail later.

After classifying the touchpoints as digits of the hand, a circle can be calculated using the touchpoints, such that the circle can be fitted to the group of touchpoints. Thereafter, the middle digit touchpoint can be identified, and a vector can be calculated for the middle digit of the hand, such that the direction of the vector extends from a radius of the circle to the middle digit touchpoint. The direction of the vector can be used to determine the orientation of the user to the touchscreen, and a user interface can be displayed on the touchscreen to correspond to the orientation of the user to the touchscreen.

In the past, touchscreen devices have been primarily configured for use in an upright position, such that a user interface displayed on the touchscreen device may be oriented to face a user. With the introduction of devices that have touchscreens in a supine configuration, such as table computers and table PCs, the touchscreen of a device is oriented to be viewed from above so that a user looks down at the touchscreen from one of the edges of the touchscreen. However, determining an orientation of a user interface to display on the touchscreen can be difficult due to a number of edges of the touchscreen which a user can be positioned.

For example, in the case that a touchscreen device has four edges, determining which of the four edges a user is located, and displaying a user interface on the touchscreen to correspond to a top-down orientation of the edge can be difficult. The present technology can determine a location of a user with respect to a device via user interaction with a touchscreen of the device and position a user interface in a top-down orientation that matches the users perspective of the touchscreen.

To further describe the present technology, examples are now provided with reference to the figures. FIG. 1 is a diagram illustrating an example of a system 100 used to determine a user orientation 108 with respect to an edge 128a-d of a touchscreen 102 and output a user interface 104 to the touchscreen 102 to correspond to the user orientation 108. As illustrated, the system 100 can include a computing device 110 and a touchscreen 102. The touchscreen 102 may be operably coupled to the computing device 110 to receive output from the computing device 110 and display the output on the touchscreen 102, and to provide input detected by a touchscreen sensor 118 to the computing device 110.

The computing device 110 can include modules that are executable by one or more processors 120. The modules can include an operating system module 112, a user interface (UI) module 114, a user orientation module 116, and other modules. The operating system module 112 can provide system software that manages computer hardware and software resources of the computing device 110 and provides common services for programs that execute on the computing device 110. As will be appreciated, any type of operating system can be provided for use on the computing device 110. The UI module 114 can be configured to provide user interfaces 104 for user-interaction with the computing device 110. The UI module 114 can be provided with access to a system directory structure and request services from the operating system module 112 in order to acquire data from input hardware devices, including the touchscreen sensor 118, and request operating system services to display input controls, prompts, status messages, and the like on the touchscreen 102.

The user orientation module 116 can be configured to determine a user orientation 108, and display a user interface 104 on the touchscreen 102 in an orientation that corresponds to the user orientation 108. In one example, touchpoint data generated by the touchscreen sensor 118 can be provided to the user orientation module 116. The touchscreen sensor 118 can generate the touchpoint data in response to detecting a touch gesture made by a user. The touchpoint data represents locations of touchpoints 106 on a surface of the touchscreen 102.

In response to receiving touchpoint data, the user orientation module 116 can analyze the touchpoint data to determine distances between each touchpoint 106 to other touchpoints 106 detected by the touchscreen sensor 118. The distances between touchpoints 106 can be used by the user orientation module 116 to identify touchpoints that correspond to a user's hand. The distances between the touchpoints 106 can be used to group the touchpoints 106 and classify the touchpoints 106 within the group as digits of a hand (e.g., thumb, index, middle, ring, and pinky digits). For example, the user orientation module 116 can analyze the touchpoint data to determine how many touchpoints 106 are included in the touchpoint data, and calculate a distance of each touchpoint 106 to other touchpoints 106. Then for each touchpoint 106, the user orientation module 116 can sort the other touchpoints by distance from a selected touchpoint and select four additional touchpoints 106 that are closest in distance. For instance, the user orientation module 116 can select a touchpoint X and sort the other touchpoints by distance to touchpoint X, and then select up to four touchpoints that are closest to touchpoint X. The selected touchpoints can form a group representing the five digits of a user's hand. In the case that fewer touchpoints are available, then the user orientation module 116 can be configured to select at least three touchpoints that are within a distance (e.g., 2-3 inches) of each other that indicates that the touchpoints correspond to digits of a user's hand.

Figure 2:
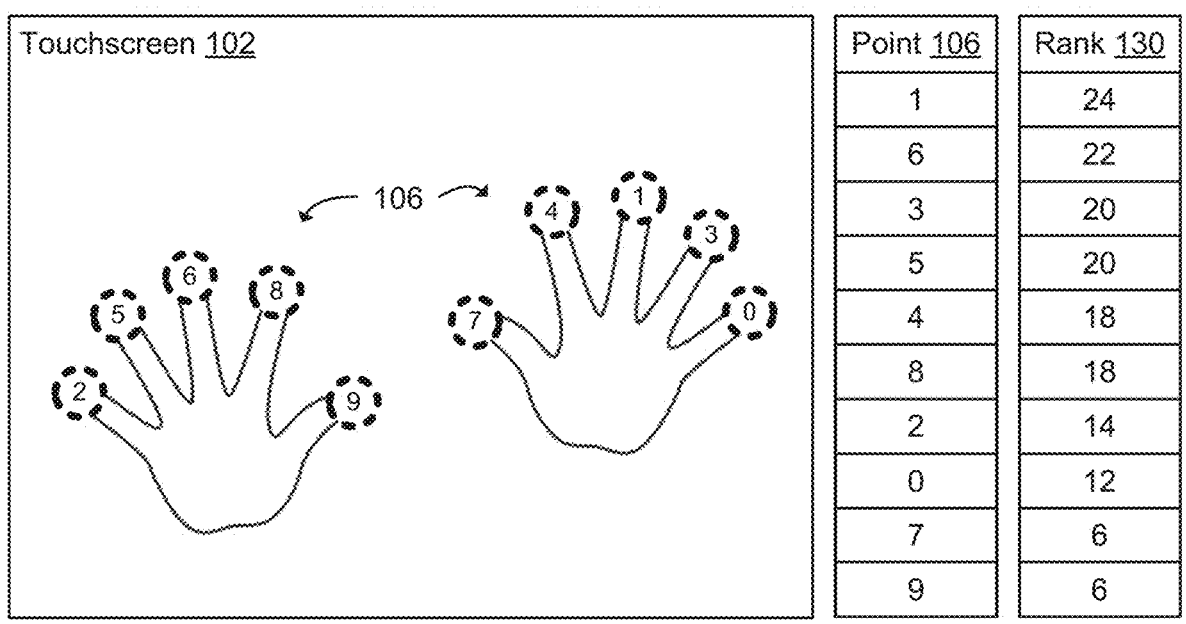
FIG. 2 is a diagram that illustrates assigning ranks to touchpoints and sorting the ranks to identify a top ranked touchpoint.

After forming one or more groups of touchpoints 106, the user orientation module 116 can rank the touchpoints 106 in a group based on a distance between the touchpoints 106, and a highest ranked touchpoint can be used as part of determining a user orientation 108. For example, as illustrated in FIG. 2, a rank 130 can be assigned to each touchpoint 106 and the ranks 130 can be sorted to identify a top ranked touchpoint. Assigning ranks 130 to the touchpoints 106 can include, in one example, calculating a score for each touchpoint 106 based on a distance of a touchpoint 106 from other touchpoints 106. Values can be assigned to a touchpoint 106 based on a distance of the touchpoint 106 from other touchpoints 106, and the values assigned to the touchpoint 106 can be summed to produce a score for the touchpoint 106. The table below illustrates a non-limiting example of values that can be assigned to a touchpoint 106 based on a distance of the touchpoint 106 from other touchpoints 106 included in a group.

| Closest | Next Closest | Next Farthest | Farthest |
| --- | --- | --- | --- |
| 7 points | 5 points | 3 points | 1 point |

As an illustration using the example values in the table above and the touchpoints 106 shown in FIG. 2, touchpoint one (1) is closest to touchpoint three (3) and touchpoint four (4), and is second closest to touchpoints zero (0) and seven (7). Therefore, based these distances, touchpoint one (1) is assigned the values of 7, 7, 5, and 5. These values are summed to produce a score of 24. The process is repeated for the other touchpoints 106 to produce scores for the touchpoints 106. After calculating the scores for the touchpoints 106, the scores can be used to rank 130 the touchpoints 106 from highest score to lowest score, as illustrated in FIG. 2. As will be appreciated, scoring systems, other than what has been described above, can be used to rank touchpoints 106.

After ranking the touchpoints 106, a top ranked touchpoint for a group of touchpoints can be identified, and the top ranked touchpoint can be used to determine a user orientation 108. In one example, a five finger gesture can be used to activate an orientation of a user interface 104 and the touchpoints 106 detected by the touchscreen sensor 118 can be used to determine a user orientation 108. Accordingly, in the example of a five finger gesture, the touchpoints 106 can be ranked as described above, and a top ranked touchpoint (e.g., touchpoint 1) can be classified as a middle digit touchpoint corresponding to a middle digit of a user's hand. Thereafter, the remaining ranked touchpoints (e.g., touchpoints 0, 3, 4, and 7) can be classified to correspond to one of the digits of the user's hand (e.g., pinky, ring, index, and thumb digits). For example, the user orientation module 116 illustrated in FIG. 1 can be configured to identify the touchpoints that are in proximity to the middle digit touchpoint and determine, for each of the touchpoints, a distance from the middle digit touchpoint, and classify a farthest distance touchpoint (e.g., touchpoint 7) from the middle digit touchpoint as a thumb digit touchpoint, and classify a second farthest distance touchpoint (e.g., touchpoint 0) from the middle digit touchpoint as a pinky digit touchpoint. Having identified the thumb and pinky touchpoints, the user orientation module 116 can classify the touchpoint (e.g., touchpoint 4) between the middle digit touchpoint and the thumb digit touchpoint as an index digit touchpoint, and classify the touchpoint (e.g., touchpoint 3) between the middle digit touchpoint and the pinky digit touchpoint as a ring finger touchpoint.

Figure 3:
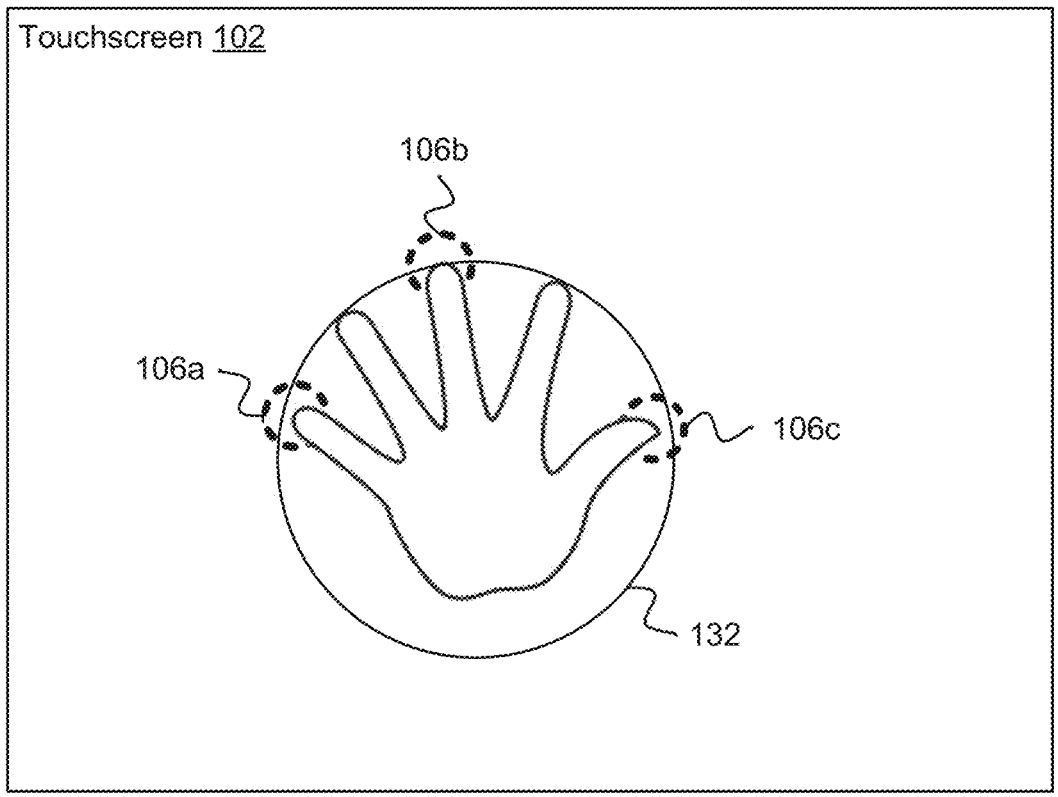
FIG. 3 is a diagram that illustrates fitting a circle to touchpoints by calculating the circle to substantially intersect the touchpoints.

Returning to FIG. 1, the user orientation module 116 can be configured to fit a circle to the touchpoints 106 that have been identified as corresponding to digits of a user's hand, and calculate a vector to indicate a direction extending from a center point of the circle to the top ranked touchpoint. The direction of the vector can indicate a direction that a user is facing. Illustratively, as shown in FIG. 3, a circle 132 can be calculated to substantially intersect the touchpoints 106a-c included in a touchpoint group that correspond to the digits of a user's hand. In one example, the circle 132 can be calculated using the touchpoints 106a-c, where given a set of n touchpoints $Pi(x_i, y_i)$ (i=1 . . . n), find the center $C(x_c, y_c)$ and the radius r of the circle that passes closest to all the touchpoints. As an example, for any given triplet of non-aligned touchpoints 106a-c, a single circle passing through all three touchpoints 106a-c comprising a triangle circumcircle can be identified, and the triangle circumcircle can be used to build an initial circle.

Figure 4:
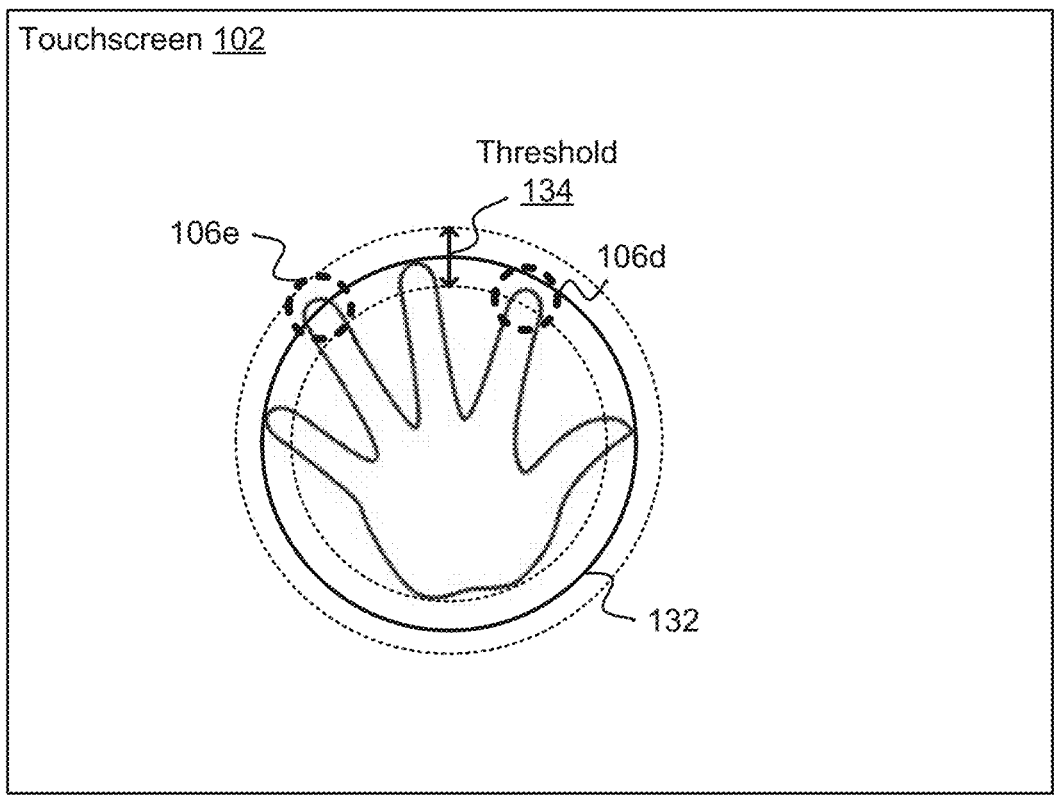
FIG. 4 is a diagram illustrating validating a five finger gesture by determining that an index digit touchpoint and a ring finger touchpoint are included in a threshold.

In the example where a five finger gesture is used to activate an orientation of a user interface, the circle 132 can be calculated using touchpoints 106a-c that have been classified as digits of a user's hand. The touchpoints 106a-c used to calculate the circle 132 can include a thumb digit touchpoint 106c, a middle digit touchpoint 106b, and a pinky digit touchpoint 106a. Thereafter, as shown in FIG. 4, the radius of the circle 132 can be used to determine whether an index digit touchpoint 106d and a ring finger touchpoint 106e are included in a threshold 134 (e.g., 1.17 and 0.83 of the radius). The threshold 134 can be used to account for variabilities in finger length that result in variation in distances between touchpoints 106. For example, an index digit touchpoint 106d and a ring finger touchpoint 106e in many cases will not intersect with a circle 132. Instead, as illustrated in FIG. 4, one or both of an index digit touchpoint 106d and a ring finger touchpoint 106e may fall inside of the edge of the circle 132 or extend past the edge of the circle 132, but may still be within the threshold 134. In the case that the index digit touchpoint 106d and the ring finger touchpoint 106e are contained within the threshold 134, then a valid five finger gesture has been detected, and an orientation of a user interface can be activated so that the user interface can be displayed and/or rotated to face a user. In another example, fewer than five fingers can be used to activate an orientation of a user interface 104. For example, at least three fingers can be used to activate a user interface 104 and the touchpoints 106 detected by the touchscreen sensor 118 can be ranked as described earlier, and a circle 132 can be calculated using the three or more touchpoints.

Figure 5:
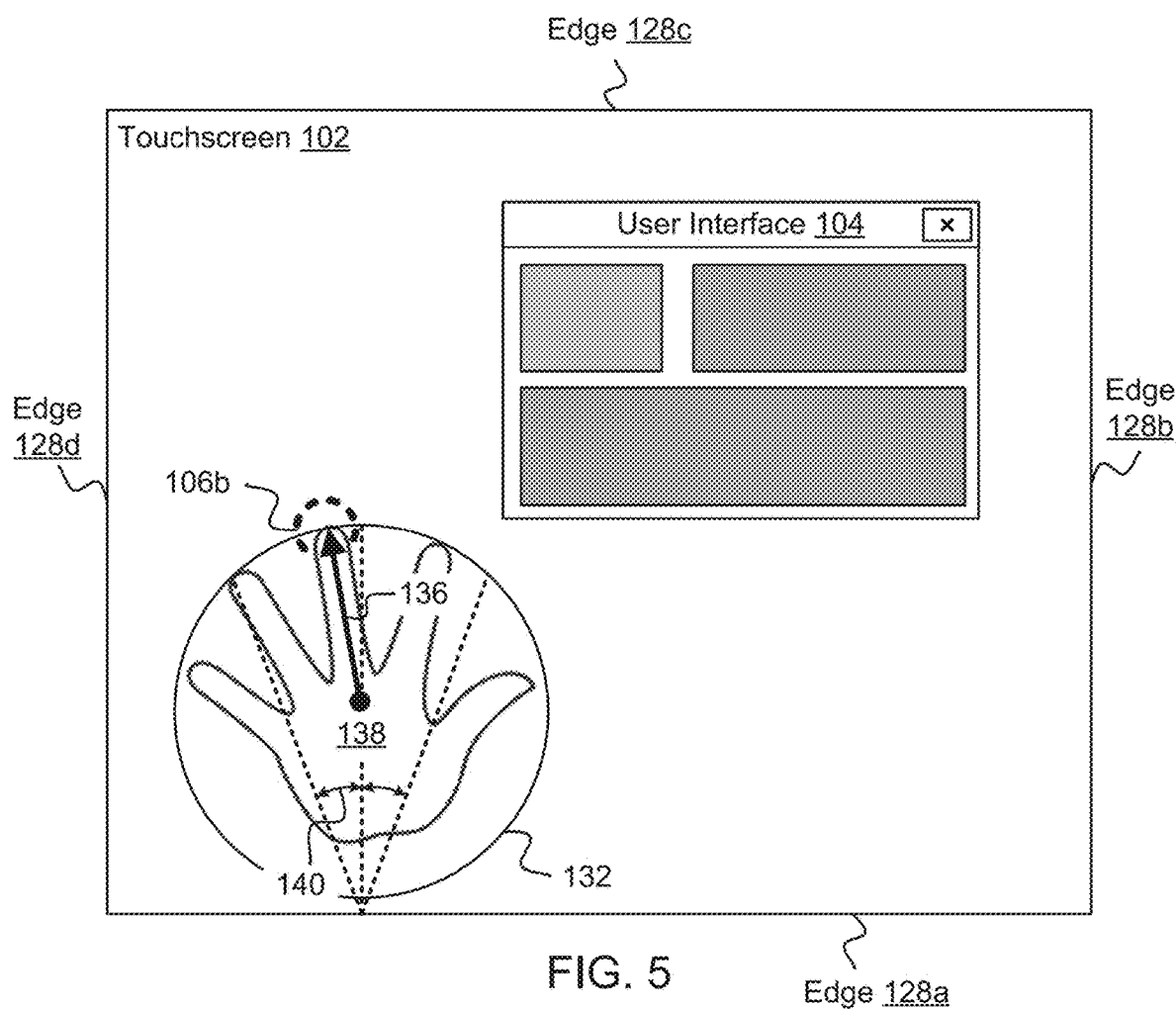
FIG. 5 is a diagram that illustrates calculating a vector that has a direction extending from a center point of a circle to a top ranked touchpoint.

As shown in FIG. 5, after calculating a circle 132, a vector 136 can be calculated for a top ranked touchpoint (or in the case of a five finger gesture, a middle digit touchpoint 106b) that has a direction that extends from a center point of the circle 132 to the top ranked touchpoint (middle digit touchpoint 106b). For example, the center point 138 of the circle and the middle digit touchpoint 106b can be identified, and the vector 136 can be calculated to start at the center point 138 of the circle 132 to the middle digit touchpoint 106b.

The direction of the vector 136 can be used to determine the orientation of the user. For example, the direction of the vector 136 can represent a direction that the user is facing.

In one example, determining the direction of a user based on a vector 136 can include using a threshold 140 or an allowable error (e.g., a forty-five degree variance from a right angle of an edge 128a-d of the touchscreen 102) to determine whether the direction corresponds to an edge 128a-d of a touchscreen 102. For example, if a vector 136 is within a threshold 140 of a right angle of a first edge 128a of a touchscreen 102, then a users position is determined to correspond to the first edge 128a of the touchscreen 102. However, if the vector 136 is not within the threshold 140 of the right angle of the first edge 128a, then the vector 136 corresponds to another edge 128b-d. Illustratively, a user can place the user's hand on a touchscreen 102 at various angles. The angle of the user's fingers may not be perfectly perpendicular to an edge 128a-d of a touchscreen 102, but may by slightly turned, such that a vector 136 calculated using touchpoints generated in response to the user's fingers touching the touchscreen 102 may not be perpendicular to an edge 128a-d of the touchscreen 102. Therefore, a threshold 140 or acceptable error can be used to compensate for a variation of the vector 136 from a right angle of the edge 128a-d.

As described above, a direction of a vector 136 can represent a direction that a user is facing with respect to an edge 128a-d of a touchscreen 102. Based on the direction indicated by the vector 136, a user interface 104 can be oriented to correspond to an orientation of the user. For example, the user interface 104 can be displayed on the touchscreen 102 to face the user, allowing the user to interact with the user interface 104.

Figure 6:
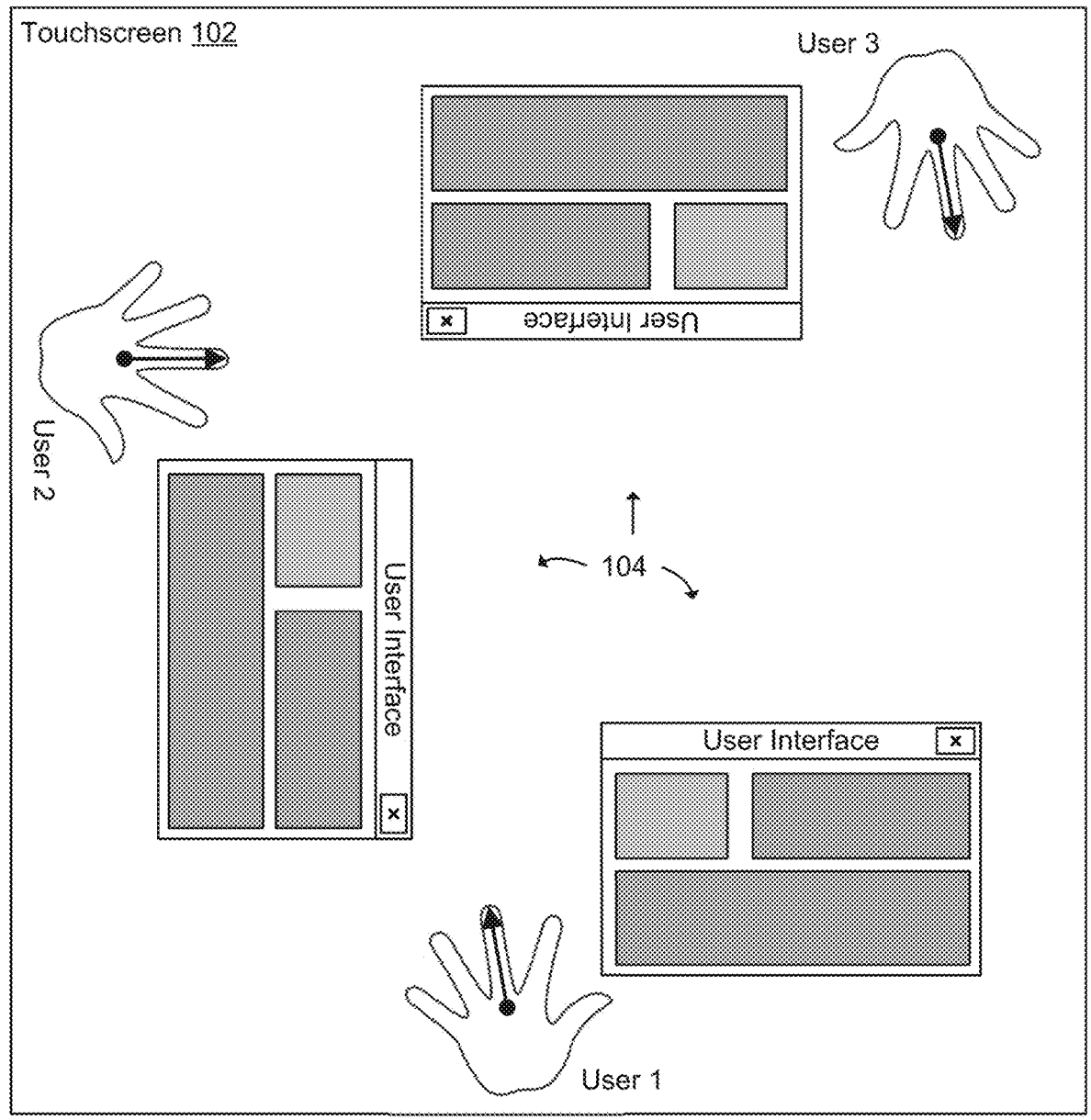
FIG. 6 is a diagram illustrating multiple users interacting with a touchscreen in a supine configuration.

FIG. 6 illustrates that multiple users can interact with a touchscreen 102 in a supine configuration, and that each user can be provided with an individual user interface 104 oriented to correspond to the orientation of the user with respect to an edge of the touchscreen 102. In the scenario of a touchscreen 102 in a supine configuration, users can benefit from the technology as they collaborate around the touchscreen 102, and based on a touch gesture made by a user, a user interface 104 can be oriented to face the user. For example, a touchscreen 102 in a supine configuration can allow multiple users to interact concurrently with an application via the touchscreen 102. The orientation of each user around the touchscreen 102 can be determined, and a user interface 104 that matches the orientation of a user can be presented for each of the users. Thus, multiple users interacting with the application via the touchscreen 102 can be provided with user interfaces 104 that are oriented to face the individual users. Although the technology is described in relation to a touchscreen 102 in a supine configuration, it is understood that the technology is not limited to touchscreens in supine configurations, and that the technology can be used with touchscreens in any configuration.

Returning to FIG. 1, a computing device 110 can include any device that can be connected to a touchscreen 102. A computing device 110 may comprise, for example a processor-based system. A computing device 110 may be a device such as, but not limited to, a table computer or table PC, desktop computer, laptop or notebook computer, tablet computer, mainframe computer system, handheld computer, network computer, or other devices with like capability. The various processes and/or other functionality contained within the system 100 may be executed on one or more processors 120 that are in communication with one or more memory devices 122, input and output (I/O) devices 124, and/or storage devices 126. While the figures described above illustrate example system environments that may implement the techniques above, many other similar or different system environments are possible. The example system environments discussed and illustrated above are merely representative and not limiting.

Figure 7:
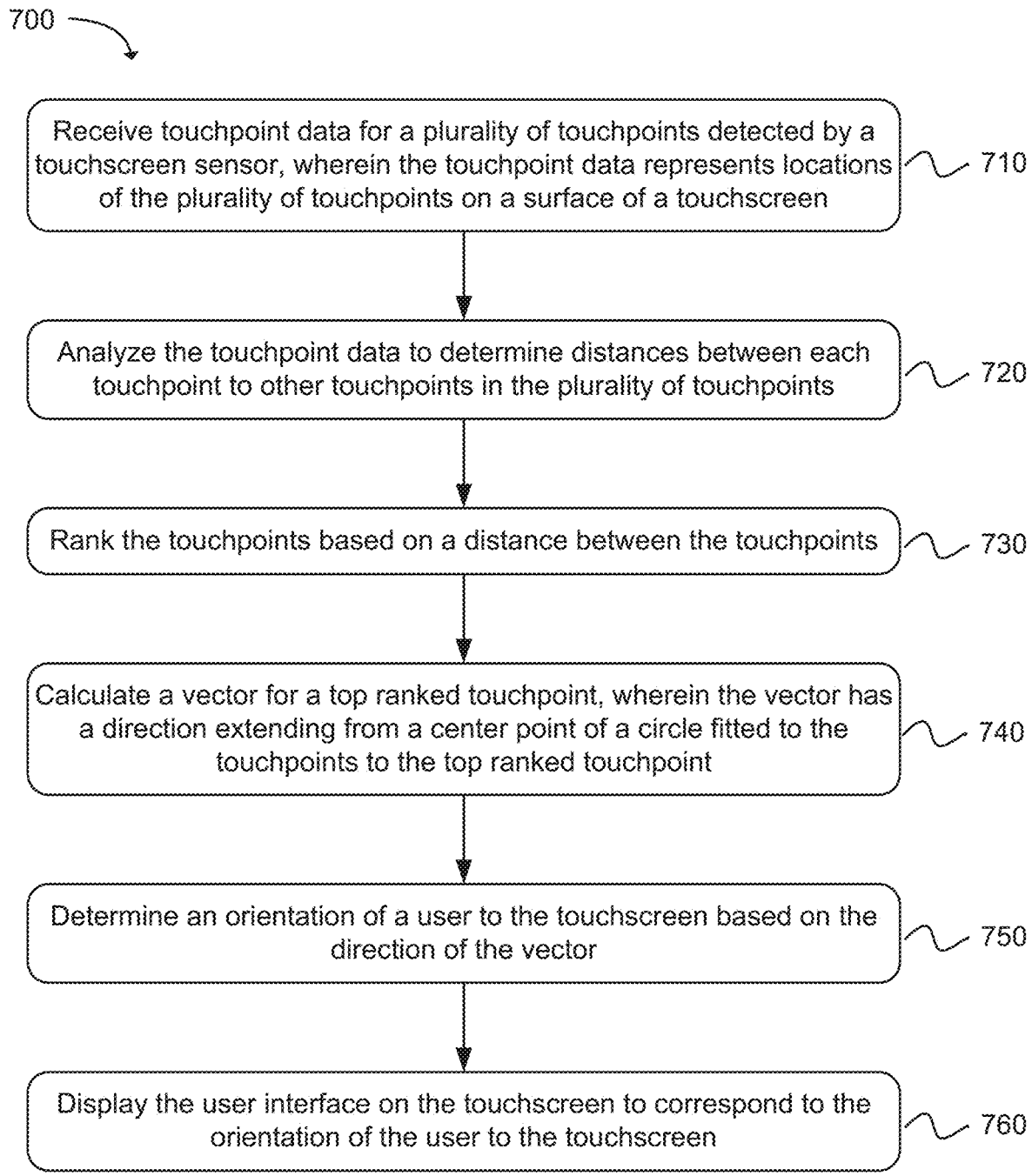
FIG. 7 is a flow diagram that illustrates an example method for orienting a user interface on a touchscreen.

Moving now to FIG. 7, a flow diagram illustrates an example method 700 for orienting a user interface on a touchscreen. As in block 710, touchpoint data can be received for a plurality of touchpoints detected by a touchscreen sensor, wherein the touchpoint data represents locations of the plurality of touchpoints on a surface of a touchscreen. In one example, the touchscreen may be in a supine configuration that allows for multiple users, and user interfaces can be displayed on the touchscreen for individual users to correspond to orientations of the individual users.

As in block 720, the touchpoint data can be analyzed to determine distances between each touchpoint to other touchpoints in the plurality of touchpoints. In one example, the method 700 can identify a group of touchpoints that correspond to an individual user's hand based on a distance between touchpoints that indicate that the touchpoints correspond to the digits of the user's hand. For example, the touchpoints can be grouped by selecting each touchpoint included in the plurality of touchpoints and sorting the other touchpoints included in the plurality of touchpoints based on the distance of the other touchpoints to the touchpoint. Up to four touchpoints that are closer in distance to the touchpoint, as compared to unselected touchpoints included in the other checkpoints, can be selected from the other touchpoints, forming a touchpoint group that corresponds to digits of an individual user's hand.

After forming a touchpoint group, the method 700 as in block 730, can rank the touchpoints based on a distance between the touchpoints. In one example, the method 700 can classify touchpoints to correspond to individual digits of a user's hand in order to identify a five finger gesture used to orient a user interface to correspond to a user's orientation to the touchscreen. The method 700 can identify a five finger gesture by classifying a top ranked touchpoint as a middle digit touchpoint, and determine, for each touchpoint in proximity to the middle digit touchpoint, a distance from the middle digit touchpoint. The method 700 can then classify a farthest distance touchpoint from the middle digit touchpoint as a thumb digit touchpoint, and classify a second farthest distance touchpoint from the middle digit touchpoint as a pinky digit touchpoint. Thereafter, the method 700 can classify a touchpoint between the middle digit touchpoint and the thumb digit touchpoint as an index digit touchpoint, and classify a touchpoint between the middle digit touchpoint and the pinky digit touchpoint as a ring finger touchpoint.

In another example, the method 700 can determine that fewer than four touchpoints are within a defined distance of the touchpoint, and select at least two touchpoints that are within the defined distance of the touchpoint. For example, where fewer than five touchpoints are available, the method 700 can select at least three touchpoints that are within a distance (e.g., 2-3 inches) of each other that indicates that the touchpoints correspond to digits of a user's hand. In the case that fewer than two touchpoints are within a defined distance of the touchpoint, the method 700, in one example, can provide an indication to a user that the orientation of the user cannot be determined due to insufficient information. In another example, touch gestures that do not include at least three touchpoints can be ignored.

As in block 740, a vector for a top ranked touchpoint can be calculated, wherein the vector can have a direction extending from a center point of a circle fitted to the touchpoints to the top ranked touchpoint. For example, the circle can be fitted to the touchpoints by calculating the circle using three or more touchpoints. In the case of a five figure gesture, a circle can be calculated using a thumb digit touchpoint, a middle digit touchpoint, and a pinky digit touchpoint. Thereafter, a determination can be made whether an index digit touchpoint and a ring finger touchpoint are included within a threshold around a radius of the circle. If a determination is made that the index digit touchpoint and the ring finger touchpoint are included within the threshold around the radius of the circle, then the touch gesture can be validated as a five finger touch gesture that activates orientation of a user interface to correspond to the user associated with the touch gesture. A vector can then be calculated to extend in a direction from a center point of the circle to the middle digit touchpoint.

After calculating the vector, an orientation of a user to the touchscreen can be determined based on the direction of the vector, as in block 750. For example, the direction of the vector can represent a direction that a user may be facing. Based on the direction indicated by the vector, a user interface can be oriented to correspond to an orientation of the user. In one example, a threshold or an allowable error can be used to determine whether a direction of a vector corresponds to an edge of a touchscreen where a user may be located. For example, as described earlier, placement of a user's hand on a touchscreen may not be perfectly perpendicular to the edge of the touchscreen. Therefore, a threshold representing a variance from a right angle of the touchscreen can be used to determine whether the direction of the vector corresponds to the edge of the touchscreen. In one example, a threshold or allowable error can be a range anywhere between zero (0) and forty-five (45) degrees on either side of a right angle of an edge of a touchscreen. As will be appreciated, other threshold or allowable error values can be used to determine whether a direction of a vector corresponds to an edge of a touchscreen where a user may be located.

As in block 760, the user interface can be displayed on the touchscreen to correspond to the orientation of the user to the touchscreen. For example, the user interface 104 can be displayed on the touchscreen 102 to face the user and match the user's perspective of the touchscreen, allowing the user to interact with the user interface 104. In one example, the user interface can be positioned on the touchscreen to be near a location on the touchscreen where a touch gesture was detected. For example, the location of the touch gesture can be used to determine a position on the touchscreen to display the user interface (e.g., under, above, next to, etc. the location where the touch gesture was detected).

Figure 8:
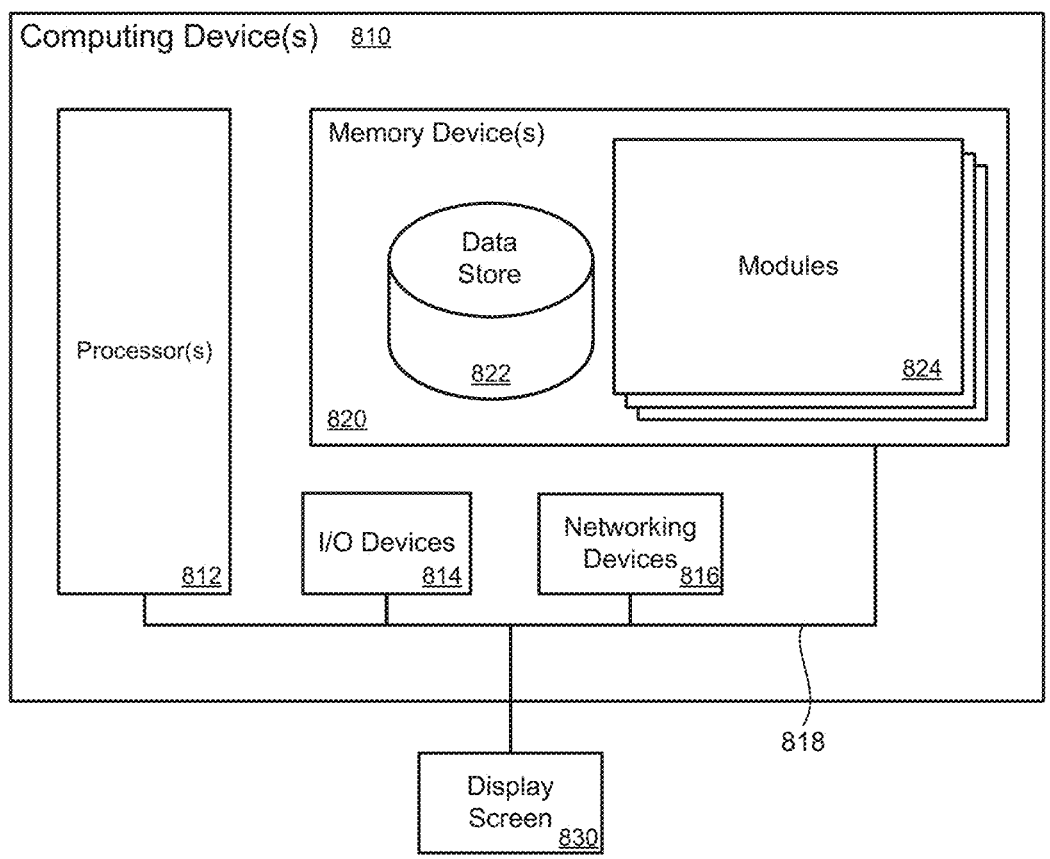
FIG. 8 is block diagram illustrating an example of a computing device that may be used to execute a method for orienting a user interface.

FIG. 8 illustrates a computing device 810 on which modules of this technology can execute. A computing device 810 is illustrated on which a high level example of the technology can be executed. The computing device 810 can include one or more processors 812 that are in communication with memory devices 820. The computing device 810 can include a local communication interface 818 for the components in the computing device. For example, the local communication interface 818 can be a local data bus and/or any related address or control busses as may be desired.

The memory device 820 can contain modules 824 that are executable by the processor(s) 812 and data for the modules 824. In one example, the memory device 820 can include an operating system module, a user interface (UI) module, a user orientation module, and other modules. The modules 824 can execute the functions described earlier. A data store 822 can also be located in the memory device 820 for storing data related to the modules 824 and other applications along with an operating system that is executable by the processor(s) 812.

Other applications can also be stored in the memory device 820 and may be executable by the processor(s) 812. Components or modules discussed in this description that can be implemented in the form of software using high-level programming languages that are compiled, interpreted or executed using a hybrid of the methods.

The computing device can also have access to I/O (input/output) devices 814 that are usable by the computing devices. One example of an I/O device can include a display screen 830, such as a touchscreen. Networking devices 816 and similar communication devices can be included in the computing device. The networking devices 816 can be wired or wireless networking devices that connect to the Internet, a LAN, WAN, or other computing network.

The components or modules that are shown as being stored in the memory device 820 can be executed by the processor(s) 812. The term "executable" can mean a program file that is in a form that can be executed by a processor 812. For example, a program in a higher level language can be compiled into machine code in a format that can be loaded into a random access portion of the memory device 820 and executed by the processor 812, or source code can be loaded by another executable program and interpreted to generate instructions in a random access portion of the memory to be executed by a processor. The executable program can be stored in any portion or component of the memory device 820. For example, the memory device 820 can be random access memory (RAM), read only memory (ROM), flash memory, a solid state drive, memory card, a hard drive, optical disk, floppy disk, magnetic tape, or any other memory components.

The processor 812 can represent multiple processors and the memory device 820 can represent multiple memory units that operate in parallel to the processing circuits. This can provide parallel processing channels for the processes and data in the system. The local communication interface 818 can be used as a network to facilitate communication between any of the multiple processors and multiple memories. The local communication interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for orienting a user interface, comprising:
   at least one processor;
   a memory device including instructions that, when executed by the at east one processor, cause the system to:
   receive touchpoint data for a plurality of touchpoints detected by a touchscreen sensor, wherein the touchpoint data represents locations of the plurality of touchpoints on a surface of a touchscreen;
   analyze the touchpoint data to determine distances between each touchpoint to other touchpoints in the plurality of touchpoints;
   rank the touchpoints based on the distances between the touchpoints;
   calculate a vector for a top ranked touchpoint, wherein the vector has a direction extending from a center point of a circle fitted to the touchpoints to the top ranked touchpoint;
   determine an orientation of a user to the touchscreen based on the direction of the vector; and
   display the user interface on the touchscreen to correspond to the orientation of the user to the touchscreen.

2. The system in claim 1, wherein the instructions that, when executed by the at least one processor, further cause the system to:
   select each touchpoint included in the plurality of touchpoints;
   sort the other touchpoints included in the plurality of touchpoints based on the distance of the other touchpoints to the touchpoint; and
   select up to four touchpoints from the other touchpoints that are closer in distance to the touchpoint as compared to unselected touchpoints included in the other checkpoints.

3. The system in claim 1, wherein the instructions that, when executed by the at least one processor, cause the system to rank the touchpoints, further cause the system to:
   calculate a score for each touchpoint included in the group based on the distance between touchpoints; and
   rank the touchpoints based on the score of the touchpoints; and
   classify a top ranked touchpoint as a middle digit touchpoint.

4. The system in claim 3, wherein the memory device further includes instructions that, when executed by the at least one processor, cause the system to:
   identify touchpoints in proximity to the middle digit touchpoint;
   determine for each of the touchpoints a distance from the middle digit touchpoint;
   classify a farthest distance touchpoint from the middle digit touchpoint as a thumb digit touchpoint; and
   classify a second farthest distance touchpoint from the middle digit touchpoint as a pinky digit touchpoint.

5. The system in claim 4, wherein the memory device further includes instructions that, when executed by the at least one processor, cause the system to:
   classify a touchpoint between the middle digit touchpoint and the thumb digit touchpoint as an index digit touchpoint; and
   classify a touchpoint between the middle digit touchpoint and the pinky digit touchpoint as a ring finger touchpoint.

6. The system in claim 1, wherein the instructions that, when executed by the at least one processor, cause the system to calculate the circle using touchpoints classified as a thumb digit touchpoint, a middle digit touchpoint, and a pinky digit touchpoint.

7. The system in claim 6, wherein the memory device further includes instructions that, when executed by the at least one processor, cause the system to determine whether an index digit touchpoint and a ring finger touchpoint are included in a circle threshold around a radius of the circle.

8. The system in claim 1, wherein the touchscreen is in a supine configuration that allows for multiple users, and user interfaces are displayed on the touchscreen for individual users to correspond to orientations of the individual users.

9. A computer implemented method, comprising:
   receiving touchpoint data for a plurality of touchpoints detected by a touchscreen sensor, wherein the touchpoint data represents locations of the plurality of touchpoints on a surface of a touchscreen device;
   calculating distances between each touchpoint to other touchpoints in the plurality of touchpoints using the touchpoint data;
   identifying a group of touchpoints that have a distance between touchpoints which indicates that the touchpoints correspond to digits of a hand;
   calculating scores for the touchpoints based on the distance between the touchpoints;
   ranking the touchpoints based on the scores of the touchpoints;
   calculating a vector of a top ranked touchpoint, wherein the vector has a direction extending from a center point of a circle fitted to the touchpoints to the top ranked touchpoint;
   determining an orientation of a user to the touchscreen device based on the direction of the vector; and
   displaying a user interface on the touchscreen device to correspond to the orientation of the user to the touchscreen device.

10. The method in claim 9, wherein identifying the group of touchpoints further comprises:
    selecting a touchpoint included in the plurality of touchpoints;
    sorting other touchpoints included in the plurality of touchpoints based on the distance of the other touchpoints to the touchpoint; and
    selecting four touchpoints that are closest in distance to the touchpoint.

11. The method in claim 10, further comprising:
    determining that fewer than four touchpoints are within a defined distance of the touchpoint; and
    selecting at least two touchpoints that are within the defined distance of the touchpoint.

12. The method in claim 11, further comprising:
determining that fewer than two touchpoints are within a defined distance of the touchpoint; and
providing an indication to the user that the orientation of the user cannot be determined.

13. The method in claim 9, further comprising:
identifying touchpoints included in the group of touchpoints that are in proximity to the top ranked touchpoint;
determining for each of the touchpoints a distance from the top ranked touchpoint; and
classifying the touchpoints to correspond to the digits of the hand based on the distance of a touchpoint to the top ranked touchpoint.

14. The method in claim 13, further comprising:
classifying a farthest distance touchpoint from the top ranked touchpoint as a thumb digit touchpoint;
classifying a second farthest distance touchpoint from the top ranked touchpoint as a pinky digit touchpoint;
classifying a first touchpoint between the top ranked touchpoint and the thumb digit touchpoint as an index digit touchpoint; and
classifying a second touchpoint between the top ranked touchpoint and the pinky digit touchpoint as a ring finger touchpoint.

15. The method in claim 9, wherein calculating the vector of the top ranked touchpoint further comprises calculating the circle using a thumb digit touchpoint, a middle digit touchpoint, and a pinky digit touchpoint.

16. The method in claim 15, further comprising determining whether an index digit touchpoint and a ring finger touchpoint are included in a threshold around a radius of the circle.

17. A non-transitory machine readable storage medium including instructions embodied thereon, wherein the instructions, when executed by at least one processor:
receive touchpoint data for a plurality of touchpoints detected by a touchscreen sensor, wherein the touchpoint data represents locations of the plurality of touchpoints on a surface of a touchscreen device in a supine configuration that allows for multiple users;
calculate distances between the plurality of touchpoints using the touchpoint data;
create a group of touchpoints that have a distance between the touchpoints indicating that the touchpoints correspond to digits of a hand;
classify the touchpoints in the group of touchpoints to correspond to the digits of a hand based on the distance between the touchpoints;
calculate a vector of a middle digit touchpoint, wherein the vector has a direction extending from a center point of a circle fitted to the touchpoints to the middle digit touchpoint;
determine an orientation of a user to the touchscreen device based on the direction of the vector; and
display a user interface on the touchscreen device to correspond to the orientation of the user to the touchscreen device.

18. The non-transitory machine readable storage medium in claim 17, wherein the instructions, that when executed by the at least one processor, create a group of touchpoints, further:
select a touchpoint included in the plurality of touchpoints;
sort other touchpoints included in the plurality of touchpoints based on the distance of the other touchpoints to the touchpoint; and
select up to four touchpoints from the other touchpoints that are closer in distance to the touchpoint as compared to unselected touchpoints included in the other checkpoints.

19. The non-transitory machine readable storage medium in claim 17, wherein the instructions, that when executed by the at least one processor, classify the touchpoints, further:
calculate a score for each touchpoint included in the group based on the distance between touchpoints;
rank the touchpoints from highest to lowest based on the score of the touchpoints; and
classify a top ranked touchpoint as the middle digit touchpoint.

20. The non-transitory machine readable storage medium in claim 17, wherein the instructions, that when executed by the at least one processor, further determine that the direction of the vector is within a threshold of a right angle of an edge of the touchscreen.

21. The non-transitory machine readable storage medium in claim 17, wherein the instructions, that when executed by the at least one processor, calculate a vector of a middle digit, further:
calculate the circle using a thumb digit touchpoint, a middle digit touchpoint, and a pinky digit touchpoint; and
determine whether an index digit touchpoint and a ring finger touchpoint are included in a threshold around a radius of the circle.

* * * * *